(12) United States Patent  (10) Patent No.: US 7,707,673 B2
Durbin  (45) Date of Patent: May 4, 2010

(54) SYSTEM AND METHOD FOR HARDENING BALLET SHOES

(76) Inventor: Tanya Durbin, 406 Aracapu, Irvine, CA (US) 92602

( * ) Notice: Subject to any disclaimer, the term of this patent is extended or adjusted under 35 U.S.C. 154(b) by 1095 days.

(21) Appl. No.: 11/232,631

(22) Filed: Sep. 22, 2005

(65) Prior Publication Data

US 2006/0145392 A1    Jul. 6, 2006

Related U.S. Application Data

(60) Provisional application No. 60/612,188, filed on Sep. 22, 2004.

(51) Int. Cl.
   *A43D 5/00*     (2006.01)
(52) U.S. Cl. .......................... 12/142 Q; 36/8.3; 36/98; 264/36.1; 264/36.22; 425/11
(58) Field of Classification Search ............... 264/36.1, 264/36.22; 425/11; 36/8.3, 98; 12/142 Q
   See application file for complete search history.

(56) References Cited

U.S. PATENT DOCUMENTS 3,406,415 A * 10/1968 Becka et al. ............... 12/146 D

| 3,681,860 | A  | * | 8/1972  | Bidegain ..................... 36/112 |
| 3,769,070 | A  | * | 10/1973 | Schilt ......................... 427/230 |
| 4,453,996 | A  |   | 6/1984  | Terlizzi, Jr. et al. |
| 5,035,069 | A  |   | 7/1991  | Minden |
| 5,129,165 | A  |   | 7/1992  | Woodle |
| 5,220,735 | A  |   | 6/1993  | Raoul-Duval |
| 5,469,641 | A  |   | 11/1995 | Subotic |
| 5,740,618 | A  |   | 4/1998  | Minden |
| 6,368,661 | B2 | * | 4/2002  | Nakano ..................... 427/142 |
| 2003/0070319 | A1 |  | 4/2003  | Minden |

FOREIGN PATENT DOCUMENTS

WO    WO 02/087374 A1    11/2002

* cited by examiner

*Primary Examiner*—Philip C Tucker
*Assistant Examiner*—Alison Hindenlang
(74) *Attorney, Agent, or Firm*—Knobbe, Martens, Olson & Bear, LLP (57) ABSTRACT

Systems and methods for hardening portions of ballet pointe shoes include applying quantities of a mixed two-part epoxy resin to broken-down or softer-than-desired portions of the shoes. In some embodiments, epoxy resin is applied to interior surfaces of the toe box and/or shank portions of the shoe. In some embodiments, epoxy resin can also be applied to select exterior portions of the shoes.

20 Claims, 7 Drawing Sheets

SYSTEM AND METHOD FOR HARDENING BALLET SHOES

CROSS REFERENCE TO RELATED APPLICATIONS

This Application claims the benefit of U.S. Provisional Patent Application Ser. No. 60/612,188, filed on Sep. 22, 2004, the entire contents of which are incorporated herein by reference.

BACKGROUND

1. Field of the Invention

The invention relates in general to the field of ballet shoes, and in particular to systems, methods and kits for hardening portions of ballet shoes.

2. Description of the Related Art

Ballet pointe shoes are designed to help a dancer achieve the illusion of weightlessness by allowing the dancer to stand and dance on the tips of her toes (i.e. en pointe). To achieve this, the shoes typically include a hardened toe box and a hard, rigid insole called the shank. When first purchased, pointe shoes are often either too hard, too soft, or simply ill fitting for a dancer. Thus, dancers have developed many methods to "break in" their new shoes to obtain the desired stiffness and fit. Through use, pointe shoes also break down to the point that they are no longer sufficiently stiff or properly shaped. Often, this occurs within only a few uses. Thus, dancers have long performed many "home brew" methods in attempts to harden or repair old pointe shoes according to their specific needs.

There remains a need for a simple, easy to use technique for stiffening and/or repairing pointe shoes that can be used by a wide variety of dancers and with a wide range of shoes.

SUMMARY

Systems and methods are provided for hardening ballet pointe shoes by applying quantities of a mixed two-part epoxy resin to broken-down or softer-than-desired portions of the shoes. In some embodiments, epoxy resin is applied to interior surfaces of the toe box and/or shank portions of the shoe. In further embodiments, epoxy resin can also be applied to select exterior portions of the shoes.

According to one embodiment, a method of repairing a ballet shoe comprises gaining access to an interior of a ballet pointe shoe (such as by folding back a heel portion of the shoe), obtaining a pre-determined quantity of an epoxy resin, and obtaining a pre-determined quantity of an epoxy hardener that is about half the quantity of epoxy resin. An individual then mixes the resin and hardener into an epoxy resin mixture, and then applies the mixture to an interior surface of the pointe shoe, an exterior surface, or both.

According to another embodiment, a pointe shoe repair kit is provided. The kit of this embodiment comprises a measured quantity of between about 1 and about 5 fluid ounces of an epoxy resin in a sealed resin packet and a measured quantity of an epoxy hardener in a sealed hardener packet. The measured quantity of epoxy hardener is about half of the measured quantity of epoxy resin. The kit also includes an application brush, a mixing tray, and instructions for use. The instructions for use generally instruct one to repair or harden a pair of shoes according to a method comprising: folding a heel portion of a pointe shoe backwards over a heel section of the shoe's sole; mixing the resin and hardener into an epoxy resin mixture; and using the brush to apply the mixture to an interior surface of the pointe shoe. Alternatively or in addition, the mixture can be applied to an exterior surface of the shoe.

In one embodiment, the epoxy resin consists essentially of about 80 to 99% Bisphenol A/Epiclorohydrin based epoxy resin, about 1-20% Trimethylol Propane Triglycidyl Ether and less than about 5 ppm Epichlorohydrin. In this embodiment, the epoxy hardener consists essentially of about 45 to 95% 1,3 Bis-cyclohexane dimethaneamine, about 0 to 50% Benzyl Alcohol, and about 2-20% accelerator amines.

BRIEF DESCRIPTION OF DRAWINGS

Having thus summarized the general nature of the invention, certain preferred embodiments and modifications thereof will become apparent to those skilled in the art from the detailed description herein having reference to the figures that follow, of which.

DETAILED DESCRIPTION

With reference to FIGS. 1-12, systems, methods, and kits for hardening portions of ballet pointe shoes will now be described. Embodiments of the systems and methods herein are specifically designed to repair, enhance or harden broken down or softer-than-desired areas in a pointe shoe for a dancer. These soft or broken down areas vary depending on numerous factors, but typically include portions of the toe box and the shank. Additionally, the systems and methods herein can be used in enhancing the performance and durability of a new pair of ballet shoes in order to prolong their wearable life and/or to increase the stiffness of desired portions of the shoes.

Figure 1:
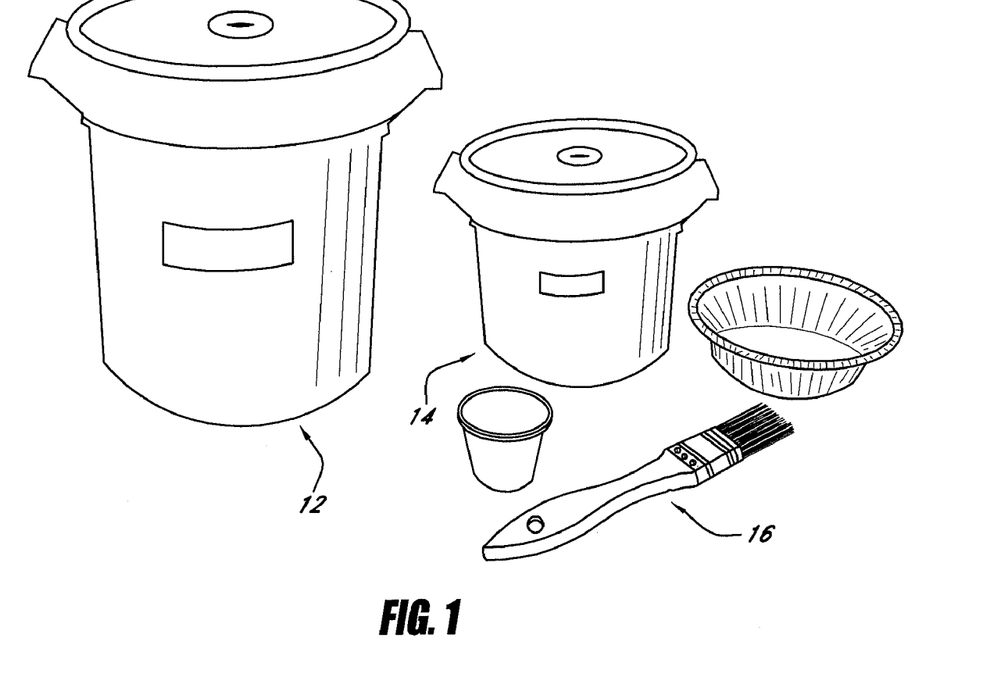
FIG. 1 is an illustration of a two-part epoxy resin, a mixing tray and a brush.
Figure 2:
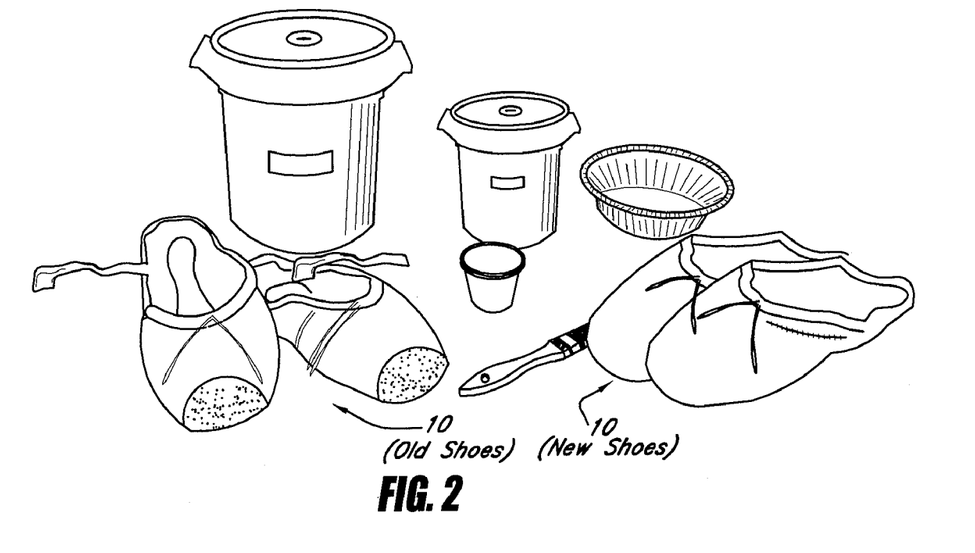
FIG. 2 is an illustration of a two-part epoxy resin, a mixing tray, a brush and two pairs of pointe shoes.
Figure 3:
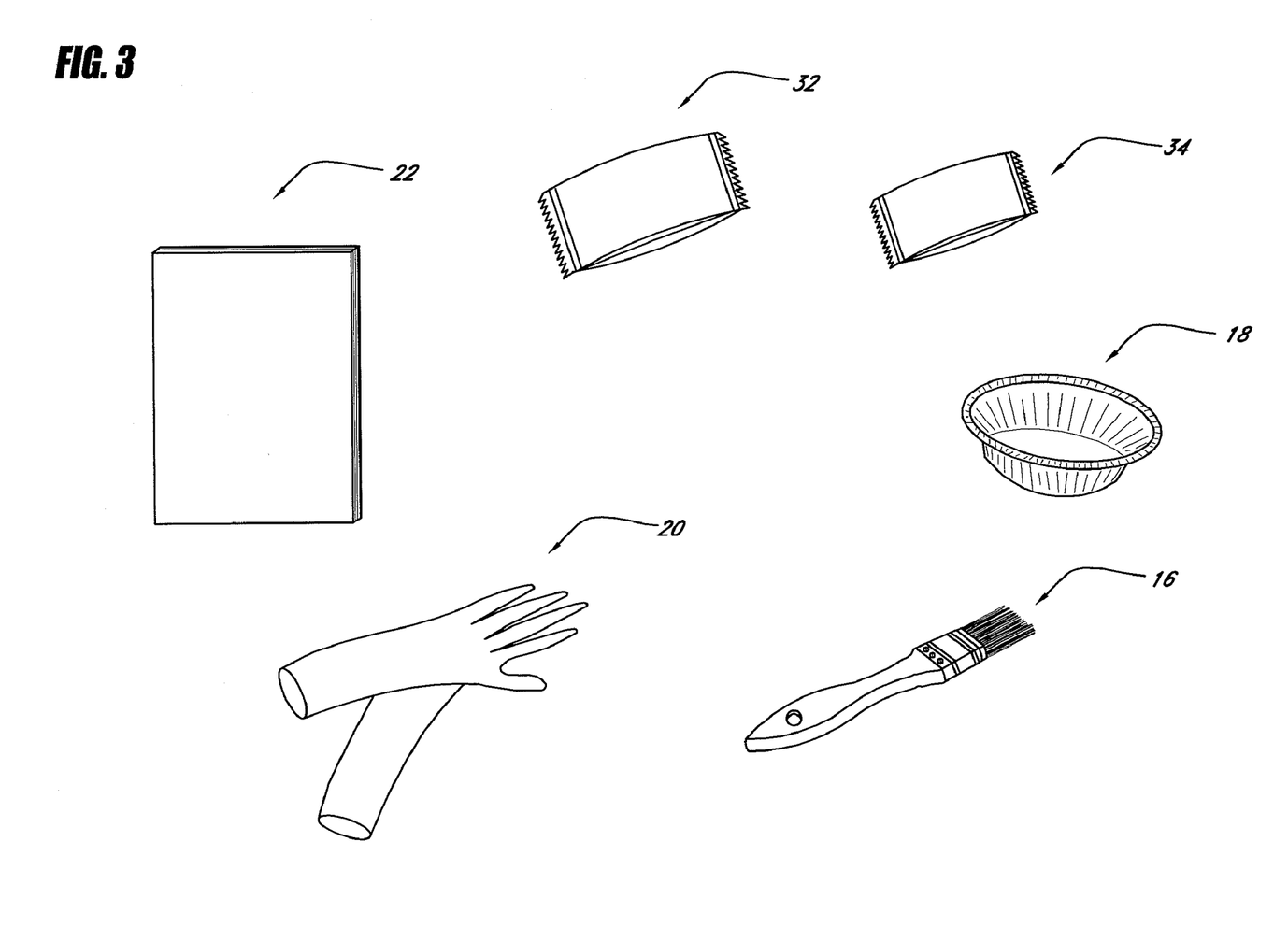
FIG. 3 is an illustration of one embodiment of a pointe shoe repair kit.
Figure 4:
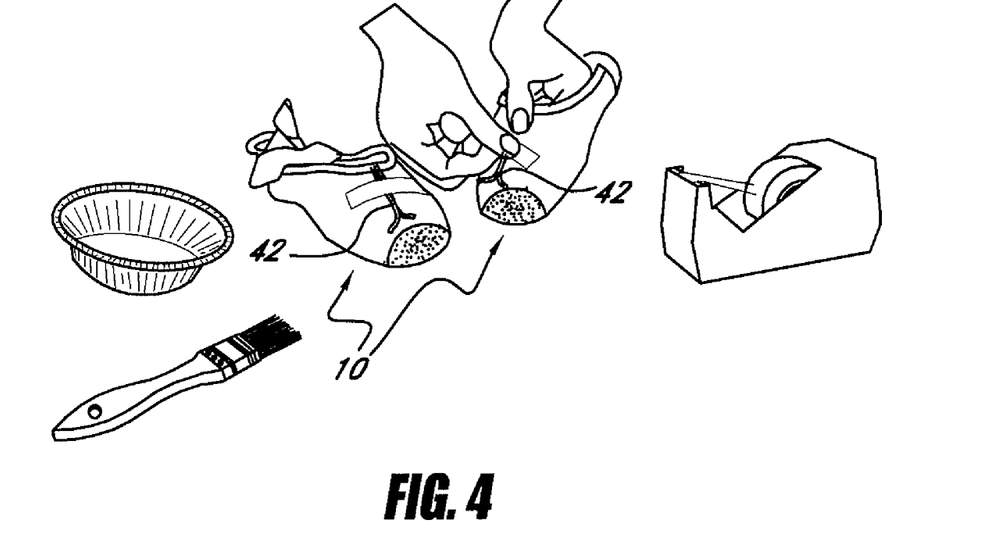
FIG. 4 illustrates a first step of preparing a pair of shoes for repair.

FIGS. 1-3 illustrate embodiments of a kit for use in hardening a pair of pointe shoes 10. In some embodiments, the kit can include a measured quantity of resin 12, a measured quantity of liquid hardener 14, a brush 16, a mixing tray 18, a pair of latex, plastic or rubber gloves 20 (if desired), and instructions for use 22. In some cases, the chemicals in epoxy resins can be skin sensitizers, or can cause other undesirable reactions with a person's skin. Thus, if desired, latex or rubber gloves 20 can be provided in order to advantageously prevent the chemicals from contacting a users' skin. In some embodiments, a kit can be configured to provide a plurality of "applications." In general, each application is a quantity of resin sufficient for a single coat to be applied to the desired portions of a pair of pointe shoes 10. Multiple applications may be desired for multiple coats to a single pair of shoes. Each application involves mixing and applying a quantity of resin to a shoe according to the methods described in further detail below. In some embodiments, a pointe shoe repair kit can be provided with materials for three to eight applications. In some preferred embodiments, a kit can provide about six applications. In still further alternative embodiments, numbers of applications greater or less than those above can be provided as desired.

In one embodiment, the measured quantity of resin can be provided in a sealed resin packet 32 and the measured quantity of hardener can be provided in a sealed hardener packet 34. In one embodiment, the packets 32, 34 are sized for a single application to a pair of pointe shoes 10. For example, it has been found that about one to about five fluid ounces is sufficient for most pointe-shoe applications. Thus, in one embodiment, a resin packet 32 is sized to contain between about one and about three fluid ounces of resin, and a hardener packet 34 can be sized to contain between about ½ and 1½ fluid ounces of liquid hardener. In one particular embodiment, the resin packet 32 is sized to contain about two fluid ounces of resin, and a hardener packet 34 is sized to contain about one fluid ounce of resin. In another embodiment, a resin packet 32 is sized to contain about 1.5 fl. oz. of resin, and the hardener packet 34 is sized to contain about 0.75 fl. oz. of liquid hardener.

In the embodiment illustrated in FIG. 3, the resin and hardener packets 32, 34 are generally one-time-use plastic or foil packets which can be cut or torn open and discarded after use. Many different materials and styles of packets can be used such that the packet is capable of safely containing the corrosive liquids. In alternative embodiments, the packets can comprise syringes, sealed tubs, tubes, or re-sealable containers as desired.

In the preferred embodiment, a two-part epoxy resin is used. In one preferred embodiment, the resin is an epoxy resin containing about 80 to 99% Bisphenol A/Epiclorohydrin based epoxy resin, about 1-20% Trimethylol Propane Triglycidyl Ether and less than about 5 ppm Epichlorohydrin; and the epoxy hardener is a material containing about 45 to 95% 1,3 Bis-cyclohexane dimethaneamine, about 0 to 50% Benzyl Alcohol, and about 2-20% accelerator amines. A suitable material is sold under the trademark, NEW ALUZINE EPOXY RESIN (also known as SVF-1, BPA-dgee Epoxy Resin) and NEW ALUZINE EPOXY HARDENER (also known as SVF-1, modified 1,3 BAC), respectively. Such materials can be purchased, for instance, from FIBERGLASS HAWAII at 246 Paoa Place, Honolulu, Hi. 96815. This material is generally preferred for use in repairing ballet pointe shoes due to its relatively slight odor, its slightly lower stiffness (thus its reduced likelihood of cracking), its lower corrosiveness, and its relatively fast drying time as compared with other resin materials. The above epoxy resin is typically combined in a two-to-one ratio of resin to hardener. Thus, in the preferred embodiment, for each fluid ounce of epoxy resin it is desirable to mix about ½ fluid ounce of hardener. In some alternative embodiments, the volume of hardener can be about 40% to about 60% of the volume of resin. In further alternative embodiments, the volume of hardener can be about 45% to about 55% of the volume of resin.

In alternative embodiments, other resins can also be used. For example, FIBERGLASS HAWAII also sells other epoxy resins, fiberglass resins and sanding resins that can also be used. Alternatively, CRYSTALINER CORPORATION, at 1626 Placentia Ave. in Costa Mesa, Calif. 92627, makes an epoxy resin under the trade name JEFCO and other resins which can also be used as described herein. Another manufacturer BIG SWELL makes a fiberglass repair kit with a polyester resin that can be used to harden pointe shoes. Other resins can also be used as desired. In general, an epoxy resin for use in hardening a pair of pointe shoes will be substantially lightweight, will have a relatively minor odor, a relatively short dry/set time, and will be sufficiently flexible to allow a shoe to bend sufficiently without cracking in order to avoid limiting a dancer's movement.

The resin is typically applied to portions of a pointe shoe by "painting" the mixed resin onto the shoe with a brush 16. The brush 16 can generally be any type recognized as suitable. Generally, bristled brushes, such as paintbrushes are preferred, however foam brushes, pads and other devices can also be used as desired. In one preferred embodiment, a one-inch wide paint brush is provided in the kit. In alternative embodiments, larger or smaller paintbrushes can also be used. In some embodiments, a kit may be provided with a plurality of inexpensive disposable brushes (e.g. as many as one for each application) such that each brush can be discarded after use.

A mixing tray 18 is generally provided in order to mix the resin and hardener before applying to the shoe. The tray 18 can generally be any suitable size or material, provided that it is appropriately resistant to any corrosiveness of the resin and/or hardener. For example, the mixing tray can be plastic, metal, aluminum, or any other material as desired. The mixing tray is generally sized to allow a user to mix a sufficient quantity of epoxy for a single application to a pair of shoes. Thus, in some embodiments, the tray can have an internal volume of between about one and about ten fluid ounces. In some particular embodiments, the tray can have an internal volume of between about three and about six fluid ounces, and in one preferred embodiment, the mixing tray has a volume of about 5 fluid ounces. In one embodiment, a portion of the kit packaging can be configured to be used as a mixing tray. For example, the resin container 32 can be configured as a mixing tray 18 into which the hardener 34 can be added after the resin is opened.

With reference now to FIGS. 4-12, a method of repairing a pair of pointe shoes 10 by applying an epoxy material will now be described. In general, a method comprises, mixing the epoxy resin (FIG. 7), applying the resin (FIGS. 9-12) to selective portions of a pointe shoe, and allowing the resin to dry.

Figure 5:
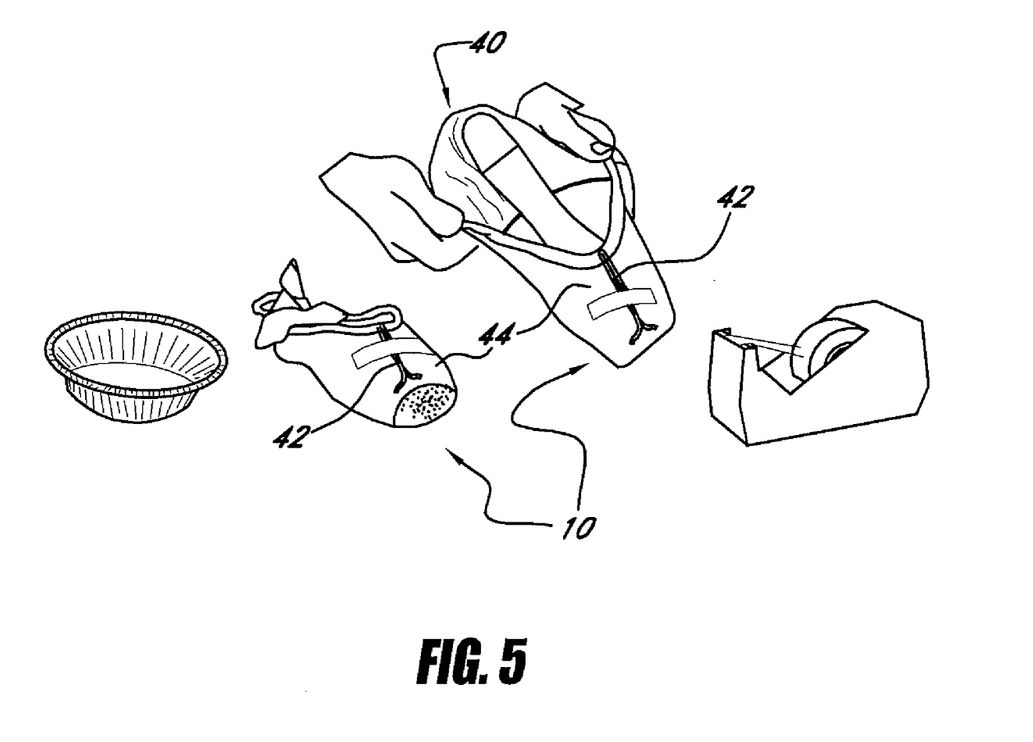
FIG. 5 illustrates a second step of preparing a pair of shoes for repair.
Figure 6:
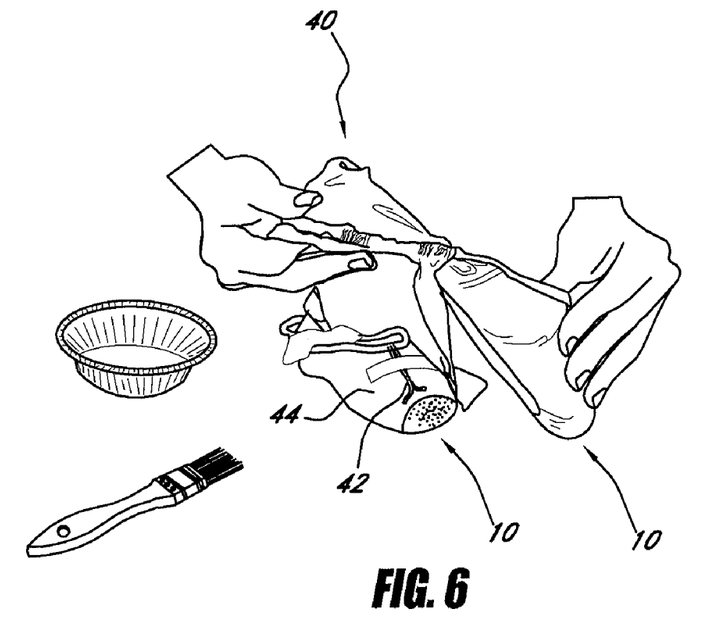
FIG. 6 is an alternative view of the step of FIG. 4.

In one embodiment, a user begins by folding back as much of the heal portion 40 of a pointe shoe 10 as possible, as shown in FIGS. 5 and 6. The user can also take the drawstring 42 and pull it straight up and over the front of the pointe shoe and tape it down to the outside of the toe box 44 so that the drawstring 42 is kept out of the way during application of the resin to the shoe.

Figure 7:
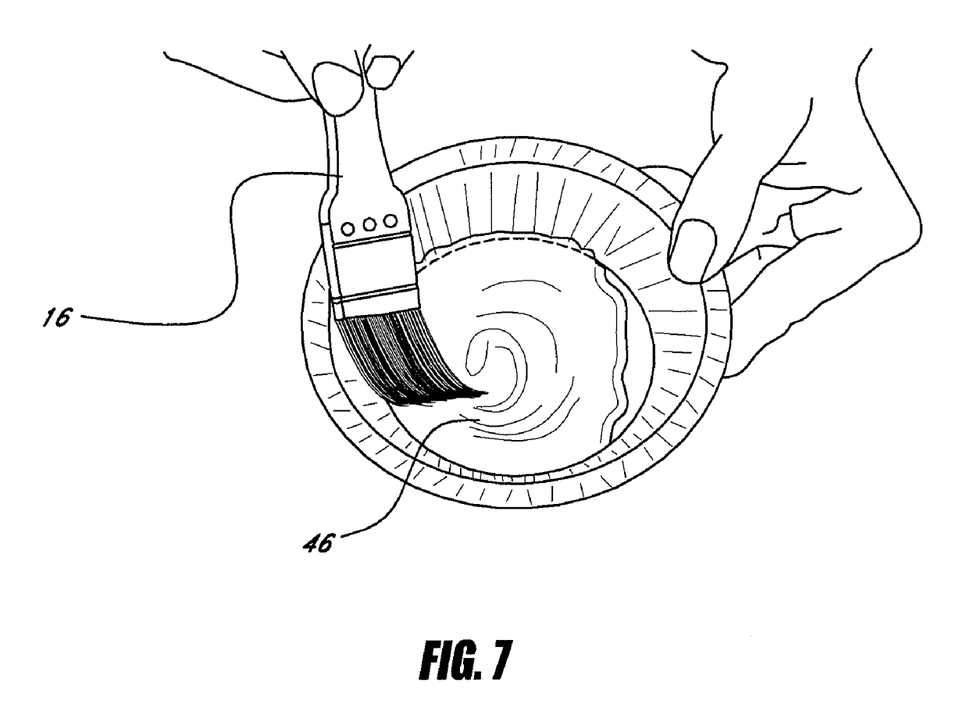
FIG. 7 is an illustration of a preparation of a two-part resin.
Figure 8:
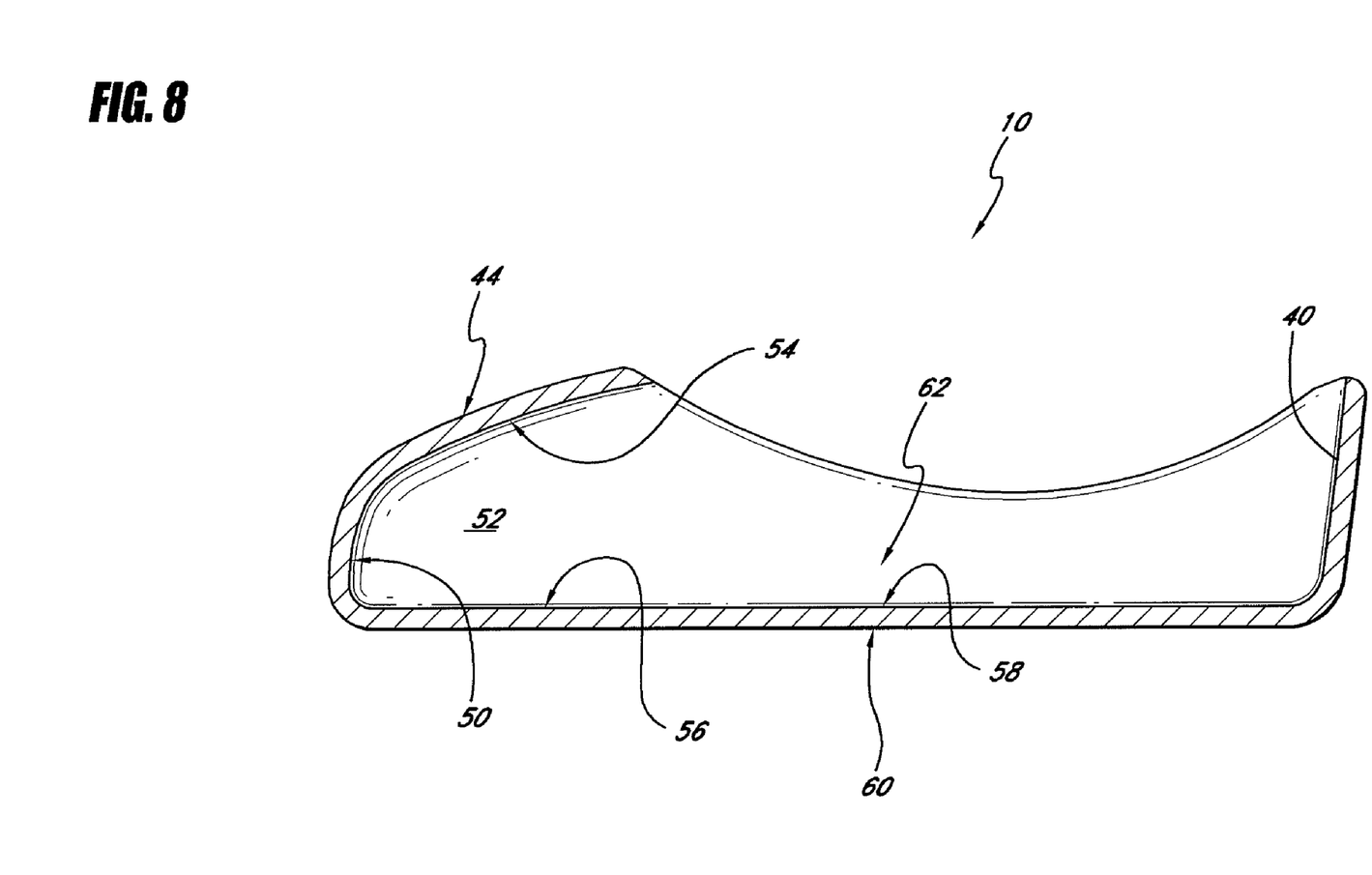
FIG. 8 is a cross-sectional illustration of a pointe shoe illustrating portions of the shoe to which resin might be applied.
Figure 9:
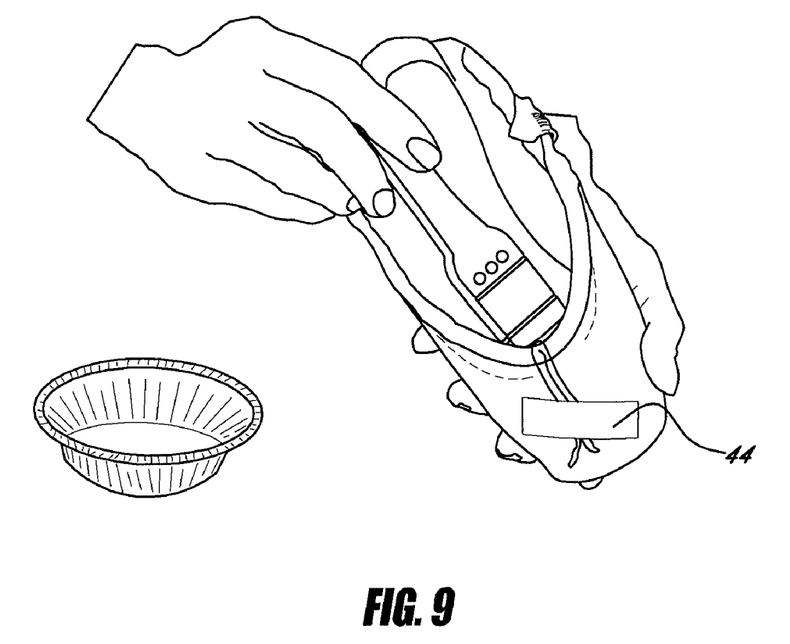
FIG. 9 illustrates a step in applying a two-part resin to an interior portion of a pointe shoe.
Figure 10:
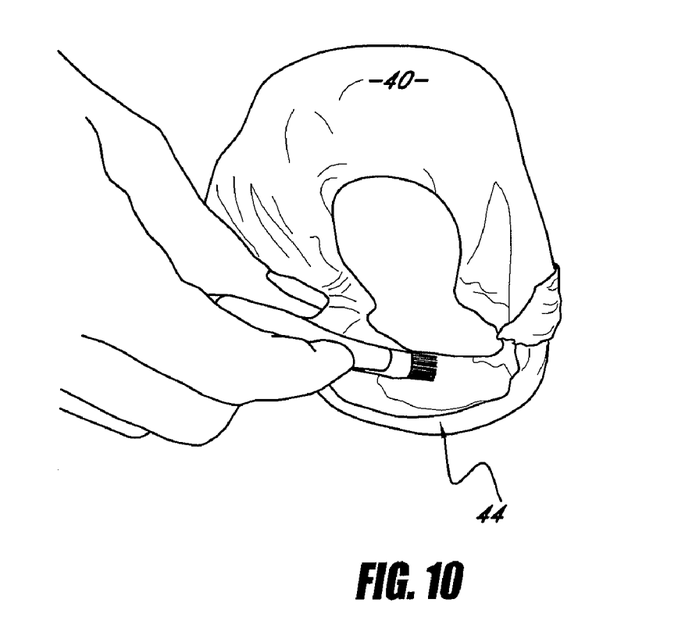
FIG. 10 illustrates a step in applying a resin to a toe portion of a pointe shoe.
Figure 11:
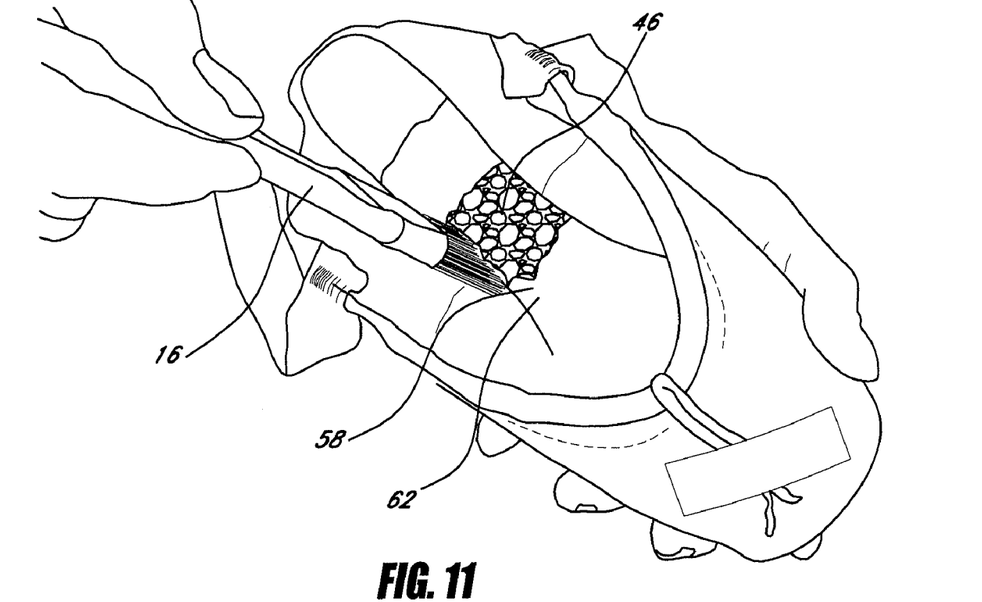
FIG. 11 is an illustration of a step in applying a resin to an interior shank portion of a pointe shoe.
Figure 12:
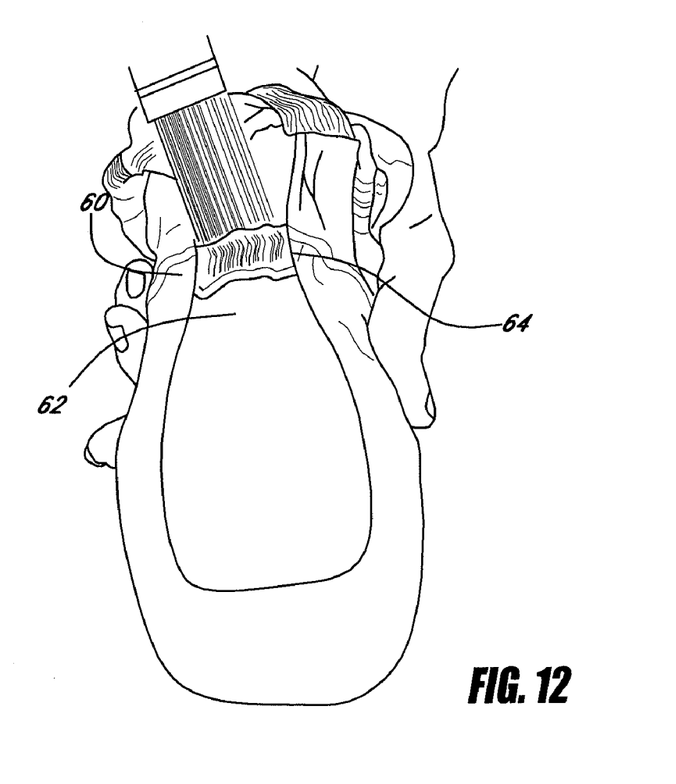
FIG. 12 illustrates a step in applying a resin to an exterior shank portion of a pointe shoe.

With reference now to FIG. 7, the user can then mix the resin by pouring the contents of the resin and hardener packets 32, 34 into the mixing tray 18 and then mixing the resin components with a brush 16, stir stick, or any other suitable mixing device. In one embodiment, the epoxy components are mixed for about 1 minute. However, in alternative preferred embodiments, the resin can be mixed for up to 3 minutes or longer until the hardener and resin reach an easily workable mixture 46.

With reference to FIGS. 8-12, once the epoxy is sufficiently mixed, a user can begin to apply the resin mixture 46 to portions of the shoe 10 with the brush 16. The resin mixture 46 can be applied to substantially any portion of the shoe that requires stiffening. In some embodiments, resin is applied to all or portions of the interior of the toe box 44, i.e. the front 50, sides 52, top 54 and/or bottom 56 interior walls of the toe box 44 of the shoe 10. In some embodiments, resin can also be applied to the interior 58 and/or exterior 60 surfaces of the shank 62 of the shoe as well.

In order to apply the resin to the toe box portion 44, one may open the pointe shoe toe box 44 as wide as possible in order to access the box with the brush. In one embodiment, a user preferably begins by applying a thin coat of resin to the bottom surface 56 of the toe box 44 of the shoe. According to this embodiment, the user then continues by applying the resin mixture 46 to the side walls 52 and then the front wall 50 of the toe box 44.

The resin mixture 46 can also be applied to the interior surface 58 of the shank 62 as desired. In some embodiments, only specific sections of the shank 62 might be coated, while in other embodiments, one may desire to coat the entire length of the shank 62.

In some embodiments, the mixed resin can be applied to the exterior 60 of the shoe at a small section at the narrowest portion 64 of the shank 62. It is generally preferred that resin not be applied to other portions of the exterior of the shoe in order to allow the dancer to retain a desired degree of traction with the dance floor surface as provided by the shoe's own outer surfaces.

Once an initial coat of resin has been applied to the shoe, the user may apply a second coat after allowing the first coat to dry and set. Further coats can also be applied as desired, provided that the resin is allowed to set in between coats. In some embodiments, it may be desirable to apply only a single coat of resin to newer shoes, which will typically retain more of their original stiffness. For older shoes, it may be desirable to apply additional coats in order to re-build the stiffness in broken-down portions of the shoe, such as the toe box and shank.

In some embodiments, once the final coat of resin has been applied to the shoes, they should be allowed to dry for at least an hour before wearing. In further embodiments, one might allow the resin to dry for longer periods of time as desired.

In some embodiments, it may be necessary or desirable to sand down "high spots" or portions of the resin that may undesirably rub against a wearer's foot. Thus, it may also be desirable to provide sand paper as a part of the kit.

In some embodiments, it may be desirable to wear the shoes for a period of time, either actually dancing, or simply walking around, in order to break-in the shoes prior to applying the resin. Thus, a shoe can be conformed to a wearer's foot prior to applying the resin.

The systems and methods provided herein provide many advantageous benefits to dancers and ballet troupes. Traditional pointe shoes can be quite expensive, and typically break down within a very short period of time. Therefore, prolonging the usable life of a pair of ballet shoes by hardening them with the methods and devices described herein, dancers and ballet troupes can substantially reduce the cost of replacing worn out pointe shoes by reducing the frequency of new shoe purchases. Once hardened using the methods and devices herein a pair of shoes will typically last substantially longer than a pair of shoes hardened by other methods. For example, a pair of shoes hardened using the methods and systems herein can last as much as 10 to 15 (or more) times longer than a pair of untreated pointe shoes. Other methods of hardening pointe shoes, such as by using model airplane-type glues or other adhesives provide only a slight extension to a pointe shoe's life, and such shoes typically break down within only one or two days of dancing. By contrast, a pair of shoes treated with the methods and devices provided herein, can last as long as two to six weeks, depending on the level and frequency of use.

Although certain embodiments and examples have been described herein, it will be understood by those skilled in the art that many aspects of the methods and devices shown and described in the present disclosure may be differently combined and/or modified to form still further embodiments. Additionally, it will be recognized that the methods described herein may be practiced using any device suitable for performing the recited steps. Such alternative embodiments and/or uses of the methods and devices described above and obvious modifications and equivalents thereof are intended to be within the scope of the present disclosure. Thus, it is intended that the scope of the present invention should not be limited by the particular embodiments described above, but should be determined only by a fair reading of the claims that follow.

What is claimed is:

1. A method of repairing and hardening a ballet shoe, the method comprising:
    gaining access to an interior of a toe portion of a ballet pointe shoe comprising folding a heel portion of the pointe shoe backwards over a heel section of the shoe's sole, the pointe shoe further comprising:
        first and second side walls, wherein each side wall extends from and is connected to the toe portion and the heel, so that folding the heel portion backwards includes folding a portion of each of the side walls over itself;
    obtaining a pre-determined quantity of an epoxy resin;
    obtaining a pre-determined quantity of an epoxy hardener that is about half said quantity of epoxy resin;
    mixing said resin and said hardener into an epoxy resin mixture;
    applying said mixture to an interior surface of the pointe shoe.

2. The method of claim 1, wherein the mixing step is performed for at least about one minute.

3. The method of claim 1, wherein the mixing step is performed for about three minutes.

4. The method of claim 1, wherein the epoxy resin consists essentially of about 80 to 99% Bisphenol A/Epichlorohydrin based epoxy resin, about 1-20% Trimethylol Propane Triglycidyl Ether and less than about 5 ppm Epichlorohydrin.

5. The method of claim 4, wherein the epoxy hardener consists essentially of about 45 to 95% 1,3 Bis-cyclohexane dimethaneamine, about 0 to 50% Benzyl Alcohol, and about 2-20% accelerator amines.

6. The method of claim 1, wherein the applying step comprises applying the mixture to an interior bottom surface of a toe portion of the pointe shoe.

7. The method of claim 1, wherein the applying step comprises applying the mixture to an interior side surface of a toe portion of the pointe shoe.

8. The method of claim 1, wherein the applying step comprises applying the mixture to an interior bottom surface of a shank portion of the pointe shoe.

9. The method of claim 1, further comprising applying the mixture to an exterior bottom surface of a shank portion of the pointe shoe.

10. The method of claim 9, wherein the exterior bottom surface of the shank portion of the pointe shoe is narrower than the remainder of the shank portion.

11. The method of claim 1, wherein said applying is performed with a brush.

12. The method of claim 1, further comprising allowing the resin to dry on the shoe and then repeating the obtaining steps, the mixing step, and the applying step.

13. The method of claim 1, further comprising allowing the resin to dry on the ballet pointe shoe and sanding down high spots of the resin.

14. The method of claim 1, further comprising allowing the resin to dry on the ballet pointe shoe and sanding portions of the resin that undesirably rub against a wearer's foot.

15. A method of hardening a ballet pointe shoe comprising:
   gaining access to an interior of a ballet pointe shoe, the ballet pointe shoe comprising:
      a toe box having front, side, top and bottom toe box walls;
      a shank having interior and exterior surfaces wherein the exterior surface is a sole;
      a heel opposite the toe box, wherein the toe box is located at one end of the shank and the heel is located at the other end;
      a first side wall that extends between and is connected to both one of the side toe box walls and the heel and is connected to the shank;
      a second side wall that extends between and is connected to both the other of the side toe box walls and the heel and is connected to the shank;
   wherein gaining access further comprises folding the heel of the pointe shoe backwards over a section of the sole nearest the heel;
   mixing a quantity of an epoxy resin and a quantity of an epoxy hardener into an epoxy resin mixture, wherein said quantity of the epoxy hardener is about half said quantity of epoxy resin;
   applying said mixture to the interior surface of the pointe shoe.

16. The method of claim 15, wherein applying said mixture to the interior surface comprises applying the mixture to the bottom and sides of the toe box.

17. The method of claim 16, wherein the applying step further comprises applying the mixture to the interior surface of the shank.

18. The method of claim 15, further comprising only applying the mixture to the exterior of the shank at a narrowest portion of the shank exterior.

19. The method of claim 18, wherein the narrowest portion is between and not including the heel and the toe.

20. The method of claim 15, wherein the ballet pointe shoe further comprises a drawstring and the method further comprises pulling the drawstring straight up and over the front of the pointe shoe and taping the drawstring down to an outside of the toe box.

* * * * *